(12) United States Patent
Chand

(10) Patent No.: US 7,574,657 B2
(45) Date of Patent: Aug. 11, 2009

(54) ADMINISTRATION MANAGER

(75) Inventor: Satish Chand, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 492 days.

(21) Appl. No.: 11/026,677

(22) Filed: Dec. 31, 2004

(65) Prior Publication Data

US 2006/0036725 A1    Feb. 16, 2006

Related U.S. Application Data

(60) Provisional application No. 60/579,343, filed on Jun. 14, 2004.

(51) Int. Cl.
*G06F 15/177*    (2006.01)
*G06F 3/00*    (2006.01)
*G06F 15/173*    (2006.01)
*G06Q 10/00*    (2006.01)

(52) U.S. Cl. .................... 715/734; 715/744; 709/223

(58) Field of Classification Search .................. 715/734, 715/744; 709/223; 705/1
See application file for complete search history.

(56) References Cited

U.S. PATENT DOCUMENTS

| | | | |
|---|---|---|---|
| 5,678,034 | A | 10/1997 | Chew |
| 5,757,371 | A | 5/1998 | Oran et al. |
| 5,838,317 | A | 11/1998 | Bolnick et al. |
| 5,870,552 | A | 2/1999 | Dozier et al. |
| 5,920,316 | A | 7/1999 | Oran et al. |
| 5,999,176 | A | 12/1999 | Kamper |
| 6,023,272 | A | 2/2000 | Malamud et al. |
| 6,215,490 | B1 | 4/2001 | Kaply |
| 6,275,230 | B1 | 8/2001 | Ingrassia, Jr. et al. |
| 6,456,307 | B1 | 9/2002 | Bates et al. |
| 6,473,505 | B1 | 10/2002 | Khuc et al. |
| 6,519,571 | B1 * | 2/2003 | Guheen et al. ................ 705/14 |
| 6,611,498 | B1 | 8/2003 | Baker et al. |
| 6,643,661 | B2 | 11/2003 | Polizzi |
| 6,662,226 | B1 | 12/2003 | Wang |
| 6,738,817 | B1 | 5/2004 | Chen |
| 6,941,371 | B2 | 9/2005 | Hartmann |
| 6,983,155 | B1 | 1/2006 | Cook |
| 7,100,195 | B1 * | 8/2006 | Underwood .................... 726/2 |
| 7,225,244 | B2 * | 5/2007 | Reynolds et al. ............ 709/223 |

(Continued)

OTHER PUBLICATIONS http://web.archive.org/web/20040306185255/www.corizon.com/benefits.html benefits: overview Mar. 6, 2004 (printed Dec. 23, 2006); 1 page.

(Continued)

*Primary Examiner*—Ting Zhou
(74) *Attorney, Agent, or Firm*—Thomas, Kayden, Horstemeyer & Risley, LLP

(57) ABSTRACT

Embodiments of the present disclosure provide systems and methods for managing an enterprise network. Briefly described, in architecture, one embodiment of the system, among others, can be implemented as follows. A plurality of computer applications is located on the enterprise network. In addition, a plurality of user clients to access the enterprise network is also provided. To manage user access of the computer applications on the enterprise network, an administration manager interface to a plurality of administration tools is utilized. In some embodiments, the administration manager interface is configured to manage administration functions of a call-center environment. Other systems and methods are also provided.

18 Claims, 12 Drawing Sheets

U.S. PATENT DOCUMENTS

| | | | |
|---|---|---|---|
| 7,263,655 | B1 | 8/2007 | Carden, Jr. |
| 7,523,413 | B2 | 4/2009 | Sims |
| 2001/0029534 | A1* | 10/2001 | Spinks et al. ............... 709/224 |
| 2001/0047417 | A1 | 11/2001 | Hartmann |
| 2002/0111824 | A1* | 8/2002 | Grainger ........................ 705/1 |
| 2003/0009752 | A1* | 1/2003 | Gupta ........................ 717/171 |
| 2003/0048286 | A1 | 3/2003 | Lal |
| 2003/0071849 | A1 | 4/2003 | Ferri |
| 2003/0088640 | A1 | 5/2003 | Rasheed et al. |
| 2003/0189597 | A1 | 10/2003 | Anderson et al. |
| 2004/0010574 | A1 | 1/2004 | Cammick |
| 2004/0028212 | A1 | 2/2004 | Lok et al. |
| 2004/0103409 | A1 | 5/2004 | Hayner |
| 2004/0117376 | A1 | 6/2004 | Lavin |
| 2004/0191744 | A1 | 9/2004 | Guirguis |
| 2004/0203750 | A1 | 10/2004 | Cowdrey et al. |
| 2004/0261037 | A1 | 12/2004 | Ording et al. |
| 2005/0044197 | A1 | 2/2005 | Lai |
| 2005/0063530 | A1 | 3/2005 | Cook et al. |
| 2005/0066037 | A1 | 3/2005 | Song et al. |
| 2005/0114792 | A1 | 5/2005 | Gest |
| 2005/0144150 | A1 | 6/2005 | Ramamurthy et al. |
| 2005/0153706 | A1 | 7/2005 | Niemenmaa et al. |
| 2005/0172235 | A1 | 8/2005 | Cragun et al. |
| 2007/0219842 | A1 | 9/2007 | Bansal et al. |

OTHER PUBLICATIONS http://web.archive.org/web/20040310140931/www.corizon.com/enterprise_features.html platform enterprise edition features: 1-3 Mar. 10, 2004 (printed Dec. 23, 2006); 3 pages.

http://web.archive.org/web/20040216191845/www.corizon.com/solutions.html Corizon Solution Feb. 16, 2004 (printed Dec. 23, 2006); 1 page.

http://web.archive.org/web/20040504231018/www.corizon.com/platform_overview.html Corizon Platform Overview May 4, 2004 (printed Dec. 23, 2006); 1 page.

http://web.archive.org/web/20040313213357/www.corizon.com/it_benefits.html Benefits for IT organisations Mar. 13, 2004 (printed Dec. 23, 2006); 1 page.

http://web.archive.org/web/20040407091225/www.corizon.com/user_benefits.html benefits for users Apr. 7, 2004 (printed Dec. 23, 2006); 1 page.

http://web.archive.org/web/20040603045823/www.netmanage.com/products/rumba/rumbaOffice.asp Rumba Office and ViewNow Jun. 3, 2004 (printed Dec. 23, 2006); 2 pages.

http://web.archive.org/web/20040603045823/http://www.netmanage.com/products/pdf/datasheets/52078-RUMBA-ENT-DS-04-04.pdf Windows-Based and Browser-Based Multi-Host Access for Evolving Enterprises Jun. 3, 2004 (printed Dec. 23, 2006); 2 pages.

http://web.archive.org/web/20040126023051/www.netmanage.com/hap/hap_access.asp Access Services Jan. 26, 2004 (printed Dec. 23, 2006); 1 page.

http://web.archive.org/web/20040404202850/www.netmanage.com/hap/hap_integration.asp Integration Services Apr. 4, 2004 (printed Dec. 23, 2006); 2 pages.

http://web.archive.org/web/20040603045044/www.netmanage.com/products/rumba/index.asp Powerful Host Access for the Evolving Enterprise Jun. 3, 2004 (printed Dec. 23, 2006); 2 pages.

http://web.archive.org/web/20040603082621/www.netmanage.com/products/rumba/rumbaw2h.asp Powerful, Secure, Easy-To-Deploy Host Access Jun. 3, 2004 (printed Dec. 23, 2006); 2 pages.

http://web.archive.org/web/20040402102021/www.netmanage.com/hap/hap_presentation.asp Presentation Services Apr. 2, 2004 (printed Dec. 23, 2006); 2 pages.

http://web.archive.org/web/20040125114121/http://toolbar.google.com/ Google Toolbar Jan. 25, 2004 (printed Dec. 23, 2006); 1 page.

http://web.archive.org/web/20040204014210/toolbar.google.com/menu_help.html Google Toolbar Feb. 4, 2004 (printed Dec. 23, 2006); 3 pages.

http://web.archive.org/web/20040217111141/toolbar.google.com/options_help.html Google Toolbar Options Feb. 17, 2004 (printed Dec. 23, 2006); 4 pages.

http://web.archive.org/web/20031206080131/toolbar.google.com/button_help.html Google Toolbar Features Dec. 6, 2003 (printed Dec. 23, 2006); 6 pages.

http://www.smartcomputing.com/editorial/article.asp?article=articles/archive/office97/09704/09704.asp&guid= Take a Shortcut to Office 87 Sep. 1998, vol. 2, Issue 3 of Smart Computing (printed Dec. 23, 2006); 7 pages.

http://www.codeproject.com/CSHARP/CSDOESSHELL3.ASP C# does Shell, Part 3 Mar. 3, 2003 (printed Dec. 23, 2006); 19 pages.

http://www.siebel.com/products/service/call_center/support_for_multiple_c.shtm May 25, 2004; 2 pages.

Microsoft Contact Center Framework White Paper Dec. 2003; 17 pages.

Microsoft Contact Center Framework A Guide to Business Benefits Dec. 2003; 13 pages.

Richard Omanson, U.S. Patent Application Entitled: "Navigational Controls for a Presentation System," U.S. Appl. No. 11/026,689, filed Dec. 31, 2004. (Note: Copy not provided as part of PTO records).

Richard Omanson; Non-Final Rejection, mailed Oct. 9, 2007, for U.S. Appl. No. 11/026,689, filed Dec. 31, 2004. (Note: Copy not provided as part of PTO records).

Lisa Sims, U.S. Patent Application Entitled: "Multiple Application Viewing," U.S. Appl. No. 11/027,325, filed Dec. 31, 2004. (Note: Copy not provided as part of PTO records).

Lisa Sims; Non-Final Rejection, mailed Aug. 22, 2007, for U.S. Appl. No. 11/027,325, filed Dec. 31, 2004 (Note: Copy not provided as part of PTO records).

Lisa Sims, U.S. Patent Application Entitled: "Viewing Applications from Inactive Sessions"; U.S. Appl. No. 11/026,679, filed Dec. 31, 2004 (Note: Copy not provided as part of PTO records).

Lisa Sims; Non-Final Rejection, mailed Nov. 21, 2007, for U.S. Appl. No. 11/026,679, filed Dec. 31, 2004 (Note: Copy not provided as part of PTO records).

William Bracey, U.S. Patent Application Entitled: "Tracking User Operations"; U.S. Appl. No. 11/026,788, filed Dec. 31, 2004 (Note: Copy not provided as part of PTO records).

Lisa Sims, U.S. Patent Application Entitled: "Floating User Interface"; U.S. Appl. No. 11/027,324, filed Dec. 31, 2004 (Note: Copy not provided as part of PTO records).

Lisa Sims; Non-Final Rejection, mailed Jul. 27, 2007, for U.S. Appl. No. 11/027,324, filed Dec. 31, 2004 (Note: Copy not provided as part of PTO records).

Lisa Sims; Final Rejection, mailed Jan. 8, 2008, for U.S. Appl. No. 11/027,324, filed Dec. 31, 2004 (Note: Copy not provided as part of PTO records).

Lisa Sims, U.S. Patent Application Entitled: "Organizing Session Applications"; U.S. Appl. No. 11/026,693, filed Dec. 31, 2004 (Note: Copy not provided as part of PTO records).

Lisa Sims; Non-Final Rejection, mailed Jul. 27, 2007, for U.S. Appl. No. 11/026,693, filed Dec. 31, 2004 (Note: Copy not provided as part of PTO records).

Lisa Sims; Examiner Interview Summary mailed Oct. 23, 2007, for U.S. Appl. No. 11/026,693, filed Dec. 31, 2004 (Note: Copy not provided as part of PTO records).

James McGlennon, U.S. Patent Application Entitled: "Frameless Data Presentation"; U.S. Appl. No. 11/026,695, filed Dec. 31, 2004 (Note: Copy not provided as part of PTO records).

James McGlennon; Non-Final Rejection, mailed Aug. 9, 2007, for U.S. Appl. No. 11/026,695, filed Dec. 31, 2004 (Note: Copy not provided as part of PTO records).

http://web.archive.org/web/20040204014210/toolbar.google.com/menu_help.html; Google Toolbar; Feb. 4, 2004 (printed Dec. 23, 2006); 3 pages.

McGlennon; Final Rejection mailed Jan. 17, 2008; U.S. Appl. No. 11/026,695, filed Dec. 31, 2004 (Note: Copy not provided as part of PTO records).

Sims; Final Rejection mailed Jan. 16, 2008; U.S. Appl. No. 11/026,693, filed Dec. 31, 2004 (Note: Copy not provided as part of PTO records).

McGlennon; Non-Final Rejection mailed Jun. 13, 2008 for U.S. Appl. No. 11/026,695, filed Dec. 31, 2004 (Note: Copy not provided as part of PTO file).
Sims; Non-Final Rejection mailed Jun. 9, 2008 for U.S. Appl. No. 11/027,325, filed Dec. 31, 2004 (Note: Copy not provided as part of PTO file).
Sims; Non-Final Rejection mailed Jun. 9, 2008 for U.S. Appl. No. 11/027,324, filed Dec. 31, 2004 (Note: Copy not provided as part of PTO file).
Sims; Final Rejection mailed May 21, 2008 for U.S. Appl. No. 11/026,679, filed Dec. 31, 2004 (Note: Copy not provided as part of PTO file).
Sims; Examiner Interview Summary mailed Oct. 23, 2007 for U.S. Appl. No. 11/026,693, filed Dec. 31, 2004 (Note: Copy not provided as part of PTO file).
Sims; Non-Final Rejection mailed Jun. 11, 2008 for U.S. Appl. No. 11/026,693, filed Dec. 31, 2004 (Note: Copy not provided as part of PTO file).
McGlennon; Examiner Interview Summary mailed Aug. 14, 2008 for U.S. Appl. No. 11/026,695, filed Dec. 31, 2004 (Note: Copy not provided as part of PTO file).
Sims; Examiner Interview Summary mailed Aug. 14, 2008 for U.S. Appl. No. 11/027,325, filed Dec. 31, 2004 (Note: Copy not provided as part of PTO file).
Sims; Examiner Interview Summary mailed Aug. 13, 2008 for U.S. Appl. No. 11/024,324, filed Dec. 31, 2004 (Note: Copy not provided as part of PTO file).
Sims; Examiner Interview Summary mailed Aug. 13, 2008 for U.S. Appl. No. 11/026,693, filed Dec. 31, 2004 (Note: Copy not provided as part of PTO file).
Windows Version 5.1, copyright 2001, screenshots 1-7.
Sims; Final Rejection mailed Nov. 20, 2008 for U.S. Appl. No. 11/027,324, filed Dec. 31, 2004 (Note: Copy not provided as part of PTO file).
Omanson; Examiner Interview Summary mailed Dec. 24, 2008 for U.S. Appl. No. 11/026,689, filed Dec. 31, 2004 (Copy not provided as PTO generated).
Omanson; Examiner Interview Summary Record mailed Jan. 7, 2008; U.S. Appl. No. 11/026,689, filed Dec. 31, 2004 (Copy not provided as PTO generated).
Sims; Examiner Interview Summary Record mailed Oct. 23, 2007; U.S. Appl. No. 11/027,324, filed Dec. 31, 2004 (Copy not provided as PTO generated).
Sims; Final Rejection mailed Jan. 7, 2008; U.S. Appl. No. 11/027,324, filed Dec. 31, 2004 (Copy not provided as PTO generated).
Sims; Non- Final Rejection mailed Jul. 27, 2007; U.S. Appl. No. 11/027,324, filed Dec. 31, 2004 (Copy not provided as PTO generated).
Sims; Examiner Interview Summary Record mailed Oct. 23, 2007; U.S. Appl. No. 11/026,693, filed Dec. 31, 2004 (Copy not provided as PTO generated).
Sims; Final Rejection mailed Dec. 3, 2008 for U.S. Appl. No. 11/027,325, filed Dec. 31, 2004 (Note: Copy note provided as part of PTO file).
Sims; Notice of Allowance and Fees Due mailed Dec. 11, 2008 for U.S. Appl. No. 11/026,693, filed Dec. 31, 2004 (Note: Copy note provided as part of PTO file).
McGlennon; Final Rejection mailed Dec. 3, 2008 for U.S. Appl. No. 11/026,695, filed Dec. 31, 2004 (Note: Copy note provided as part of PTO file).
Bracey; Non-Final Rejection mailed Sep. 26, 2008 for U.S. Appl. No. 11/026,788, filed Dec. 31, 2004 (Note: Copy not provided as part of PTO file).
Omanson; Non-Final Rejection mailed Sep. 30, 2008 for U.S. Appl. No. 11/026,689, filed Dec. 31, 2004 (Note: Copy not provided as part of PTO file).
Sims; Examiner Interview Summary mailed Mar. 10, 2009 for U.S. Appl. No. 11/026,679, filed Dec. 31, 2004 (Copy not provided as PTO generated).
Bracey; Non-Final Rejection mailed Mar. 17, 2009 for U.S. Appl. No. 11/026,788, filed Dec. 31, 2004 (Copy not provided as PTO generated).

* cited by examiner

ADMINISTRATION MANAGER

CROSS-REFERENCE TO RELATED APPLICATION

This application claims priority to U.S. provisional application entitled, "Presentation System," having Ser. No. 60/579,343, filed Jun. 14, 2004, which is entirely incorporated herein by reference.

This application is related to copending U.S. utility patent application entitled "Frameless Presentation System" filed on the same date as the present application and accorded Ser. No. 11/026,695, which is entirely incorporated herein by reference; U.S. utility patent application entitled "Navigational Controls for a Presentation System" filed on the same date as the present application and accorded Ser. No. 11/026,689, which is entirely incorporated herein by reference; U.S. utility patent application entitled "Multiple Application Viewing" filed on the same date as the present application and accorded Ser. No. 11/027,325, which is entirely incorporated herein by reference; U.S. utility patent application entitled "Organizing Session Application" filed on the same date as the present application and accorded Ser. No. 11/026,693, which is entirely incorporated herein by reference; U.S. utility patent application entitled "Viewing Applications from Inactive Sessions" filed on the same date as the present application and accorded Ser. No. 11/026,679, which is entirely incorporated herein by reference; U.S. utility patent application entitled "Floating User Interface" filed on the same date as the present application and accorded Ser. No. 11/027,324, which is entirely incorporated herein by reference; and U.S. utility patent application entitled "Tracking User Operations" filed on the same date as the present application and accorded Ser. No. 11/026,788, which is entirely incorporated herein by reference.

TECHNICAL FIELD

The present disclosure is generally related to computer networks and, more particularly, is related to the management of computer networks.

BACKGROUND

Many desktop presentation systems, such as those in use within call center environments, pose significant challenges in user productivity. For example, multiple user interface technologies, desktops, and metaphors are pervasive within today's call center environments, including for example, web browsers, X/Motif emulators, TN3270, and PC-based graphical user interfaces (GUIs). Accordingly, administration tools are needed to manage resources and to configure user settings for accessing a wide variety of technologies on a communication network. Further, user interfaces should be designed to facilitate efficient operations within such administration tools.

Thus, a heretofore unaddressed need exists in the industry to address the aforementioned deficiencies and inadequacies.

SUMMARY

Embodiments of the present disclosure provide systems and methods for managing an enterprise network. Briefly described, in architecture, one embodiment of the system, among others, can be implemented as follows. A plurality of computer applications is located on the enterprise network. In addition, a plurality of user clients to access the enterprise network is also provided. To manage user access of the computer applications on the enterprise network, an administration manager interface to a plurality of administration tools is utilized. In some embodiments, the administration manager interface is configured to manage administration functions of a call-center environment. Further, in some embodiments, the plurality of administration tools includes a first graphical tool for assigning a user profile to a particular user; a second graphical tool for designating network resources to a particular user; a third graphical tool for customizing application access rights for a particular user; and a fourth graphical tool for identifying the location of network resources.

Embodiments of the present disclosure can also be viewed as providing methods for managing an enterprise network. In this regard, one embodiment of such a method, among others, can be broadly summarized by the following steps: displaying a single graphical window on a computer desktop as an interface to a network administration program; and providing a plurality of graphical controls within the single graphical window, each graphical control accessing a different administration operation for an enterprise network, wherein each graphical control is selectable by a user from the single graphical window.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
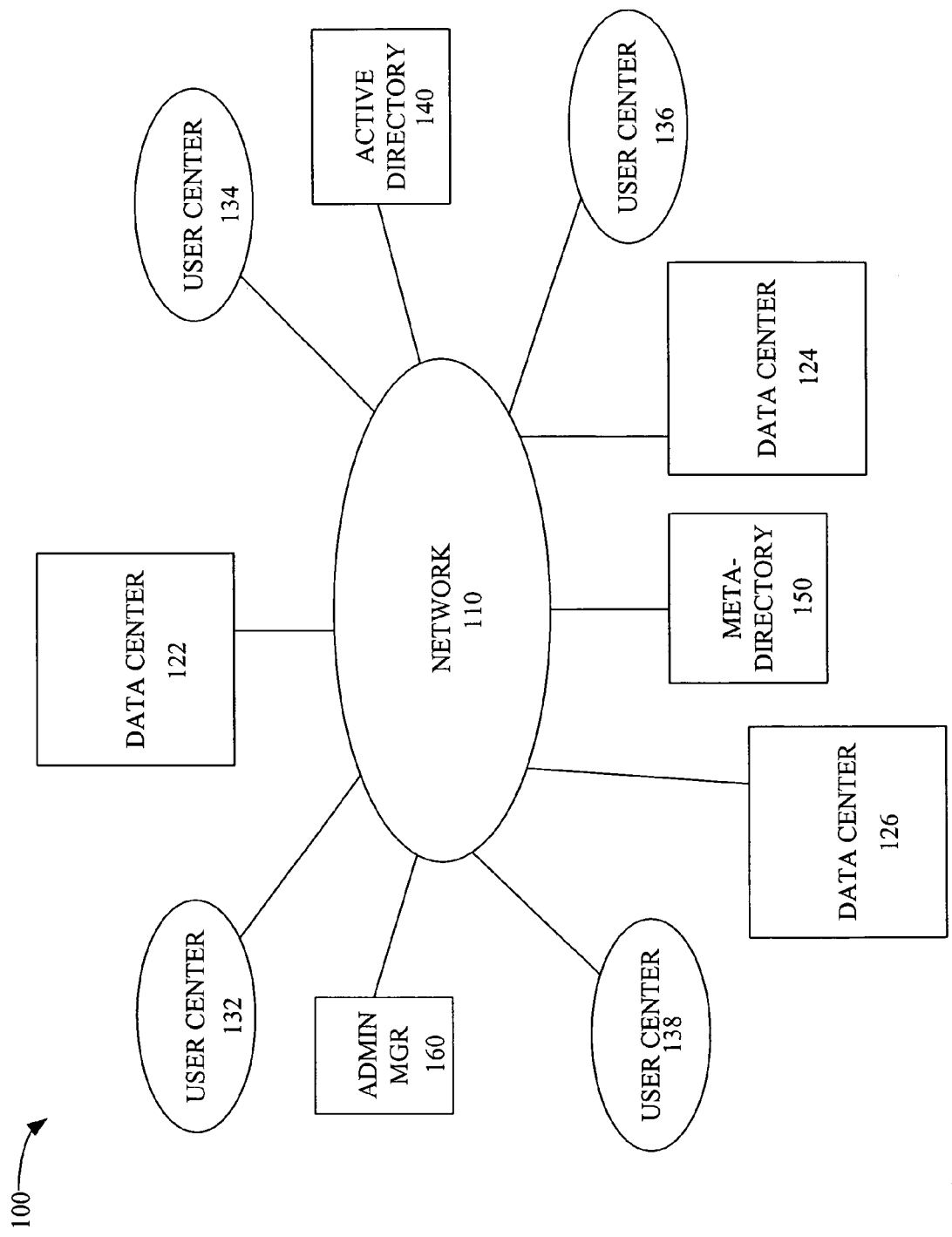
FIG. 1 is a block diagram of one embodiment, among others, of a network administration system.

FIG. 1 shows one embodiment of a network administration system 100 for providing and managing network services across a large network enterprise. The network administration system 100 in FIG. 1 comprises a backbone network 110 that connects multiple data centers 122, 124, 126, user centers 132, 134, 136, 138, and other network centers, etc. Also, included in the network administration system 100, for some embodiments, are network directories 140, 150. To help manage user access to network resources, an administration manager 160 is provided. In some embodiments, the administration manager 160 is located within one or more user centers 132, 134, 136, 138.

Figure 2:
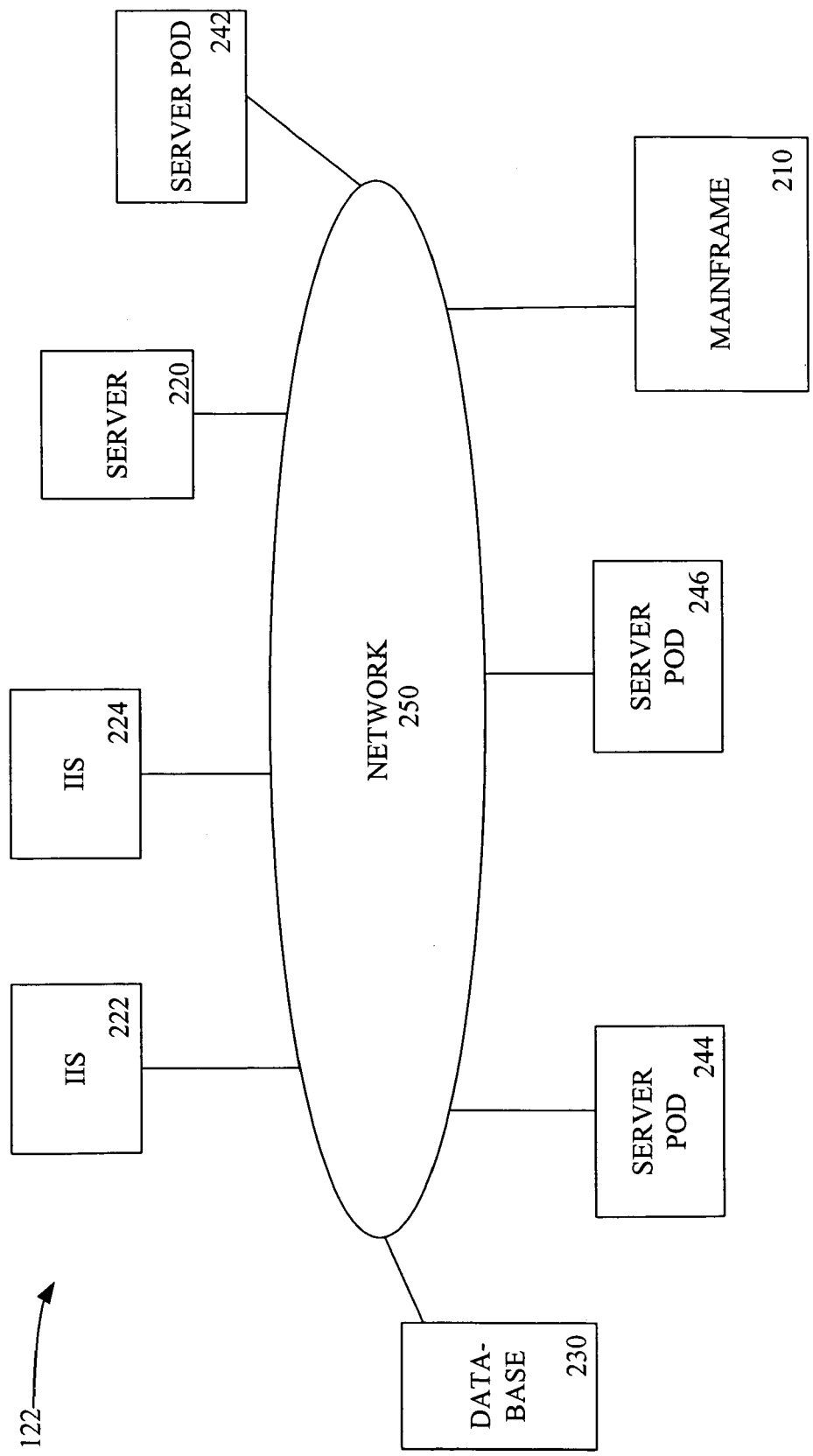
FIG. 2 is a block diagram of one embodiment, among others, of a data center of FIG. 1.

As shown in FIG. 2, within the data centers 122-126 are other computing devices, such as mainframe computer(s) 210, server(s) 220, 222, 224, database(s) 230, and other infrastructure to support and process service requests from the user centers 130-138 and other network requests, such as requests for access to computer applications. For example, a variety of computer applications may be installed on mainframe computer(s) 210. Further, web-based applications may be installed on the servers 220, 222, 224; and data accessed by these applications may be stored on the database(s) 230 within respective data centers. The various network resources communicate via a data center network 250.

A server grouping or pod 242-246 handles requests from a user client to access resources and services in the data center 122-126. Multiple high-availability pods 242-246 exist in the multiple geographically separated data centers 122-126. Each data center 122-126 is typically configured with redundant load balancers and switches, and each pod 242-246 is configured with high-availability web servers and database servers. For some embodiments, each pod 242-246 can expose one or more web services which a user client in a user center 132-138 uses to retrieve routing data from a database 140, 150 at startup of the user client. Further, each user client may be configured to access one primary pod 242-246. However, each user client may also be configured with the ability to access any other pod 242-246 in the event its primary pod 242-246 fails. According to an exemplary embodiment, all data within each pod 242-246 is replicated to one or more pods 242-246. Accordingly, some embodiments of the administration manager 160 provide an interface for configuring settings for routing and pod information, as is described below.

Referring back to FIG. 1, user centers 132-138 comprise computer clients that access applications located in the data centers 122-126 or stored locally. User centers 132-138 are typically organized by their geographic location. For example, a particular building may house many computer clients. Therefore, the building or office complex may be designated as a single user center 132-138.

Figure 3:
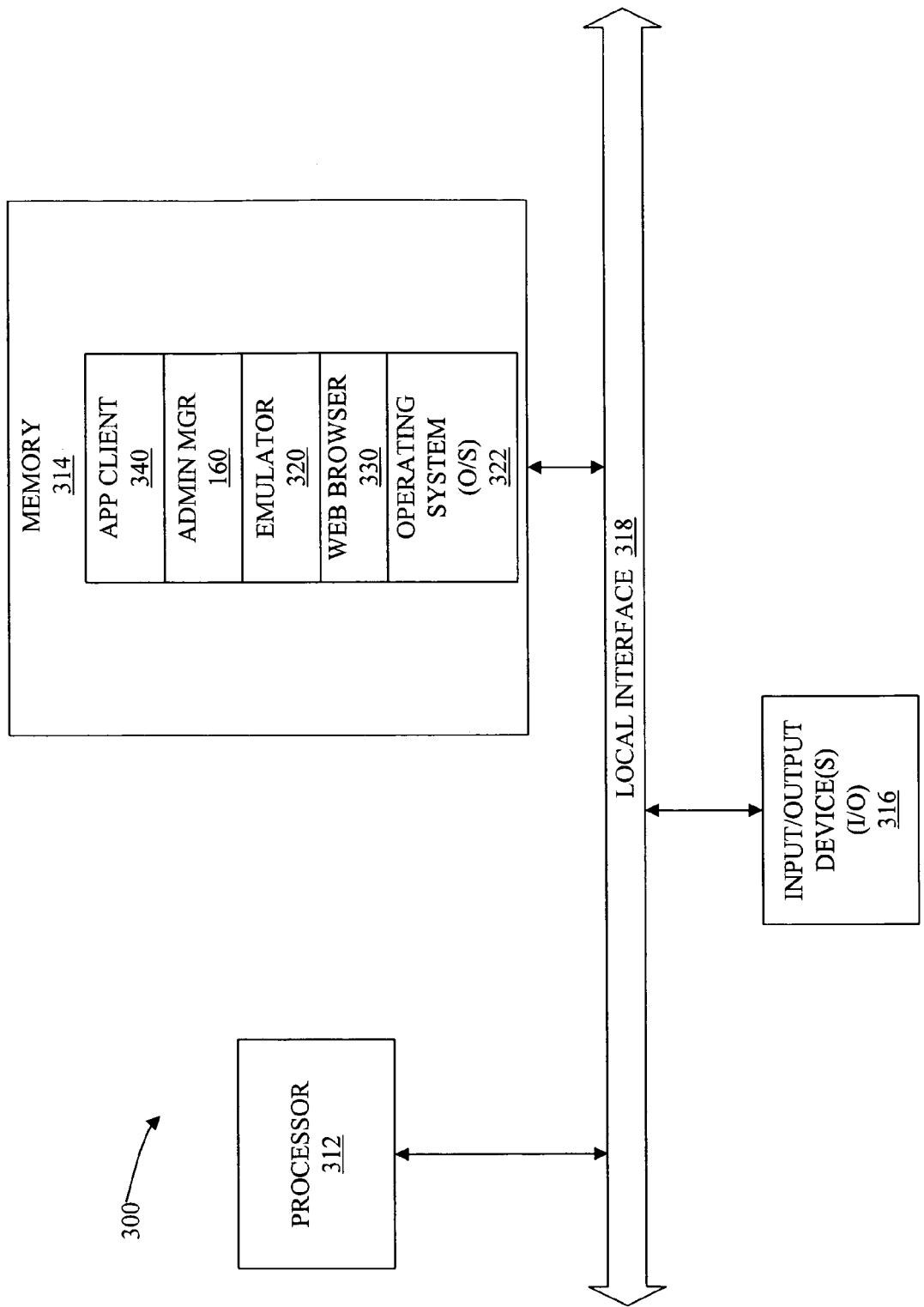
FIG. 3 is a block diagram of one embodiment, among others, of a user client as utilized in the system of FIG. 1.

In a business enterprise, mainframe computers 210 typically execute a variety of line of business (LOB) applications which may include older computer systems that are critical to the operation of the enterprise and are generally referred to as legacy systems. These legacy systems are located in data centers 122-126. To access legacy systems or applications on a mainframe computer or host 210, a user client comprises, in some embodiments, a general-purpose computer 300 with an emulation application 320 at a user center 132-238, as shown in FIG. 3. The user's general-purpose computer 300 can also be used to access web-based applications and to retrieve data from database(s) 230.

As shown, the general-purpose computer 300 includes a variety of applications also loaded into memory 314 of the general-purpose computer 300. Generally, in terms of hardware architecture, as shown in FIG. 3, the computer 300 includes a processor 312, memory 314, and one or more input and/or output (I/O) devices 316 (or peripherals) that are communicatively coupled via a local interface 318. The local interface 318 can be, for example but not limited to, one or more buses or other wired or wireless connections, as one skilled in the art would appreciate. The local interface 318 may have additional elements, which are omitted for simplicity, such as controllers, buffers (caches), drivers, repeaters, and receivers, to enable communications. Further, the local interface 318 may include address, control, and/or data connections to enable appropriate communications among the aforementioned components.

The processor 312 is a hardware device for executing software, particularly that stored in memory 314. The processor 312 can be any custom made or commercially available processor, a central processing unit (CPU), an auxiliary processor among several processors associated with the computer 300, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company®, an 80×86 or Pentium® series microprocessor from Intel Corporation®, a PowerPC® microprocessor from IBM®, a Sparc® microprocessor from Sun Microsystems, Inc.®, or a 68xxx series microprocessor from Motorola Corporation®.

The memory 314 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 314 may incorporate electronic, magnetic, optical, and/or other types of storage media. Note that the memory 314 can have a distributed architecture, where various components are situated remote from one another, but can be accessed by the processor 312.

The software in memory 314 may include one or more separate programs, each of which comprises an ordered listing of executable instructions for implementing logical functions. In the example of FIG. 3, the software in the memory 314 includes an administration manager 160 in accordance with the present disclosure; a suitable operating system (O/S) 322; terminal emulator 320; a web browser application 330, and LOB application client(s) 340. A nonexhaustive list of examples of suitable commercially available operating systems 322 is as follows: (a) a Windows® operating system available from Microsoft Corporation®; (b) a Netware® operating system available from Novell, Inc.®; (c) a Macintosh® operating system available from Apple Computer, Inc®.; (d) a UNIX® operating system, which is available for purchase from many vendors, such as the Hewlett-Packard Company®, Sun Microsystems, Inc.®, and AT&T Corporation®; (e) a LINUX® operating system, which is freeware that is readily available on the Internet; (f) a run time Vxworks® operating system from WindRiver Systems, Inc.®; or (g) an appliance-based operating system, such as that implemented in handheld computers or personal data assistants (PDAs) (e.g., PalmOS® available from Palm Computing, Inc.®, and Windows CE® available from Microsoft Corporation®). The operating system 322 controls the execution of other computer programs, such as the administration manager 160, and provides scheduling, input-output control, file and data management, memory management, and communication control and related services.

The administration manager 160 is a source program, executable program (object code), script, or any other entity comprising a set of instructions to be performed. When a source program, then the program needs to be translated via a compiler, assembler, interpreter, or the like, which may or may not be included within the memory 174, so as to operate properly in connection with the O/S 322. Furthermore, the administration manager can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 316 may include input devices, for example but not limited to, a keyboard, mouse, scanner, microphone, etc. Furthermore, the I/O devices 316 may also include output devices, for example but not limited to, a printer, display, etc. Finally, the I/O devices 316 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 300 is a PC, workstation, or the like, the software in the memory 314 may further include a basic input output system (BIOS) (omitted for simplicity). The BIOS is a set of software routines that initialize and test hardware at startup, start the O/S 322, and support the transfer of data among the hardware devices. The BIOS is stored in ROM so that the BIOS can be executed when the computer 300 is activated.

When the computer 300 is in operation, the processor 322 is configured to execute software stored within the memory 314, to communicate data to and from the memory 314, and to generally control operations of the computer 300 pursuant to the software. The administration manager 160, the O/S 322, and other local applications 340, in whole or in part, are read by the processor 322, perhaps buffered within the processor 322, and then executed.

Referring back to FIG. 1, the general-purpose computer 300 includes an administration manager 160 for managing administrative functions of the enterprise network 100. The administration manager 160, in some embodiments, comprises a single graphical interface display with graphical controls to a variety of administrative functions. In some embodiments, the administration manager 160 comprises a .NET® client that is deployed on a desktop of the general-purpose computer 300. The .NET® client manages hosted application interaction. For example, hosted applications or clients may comprise a variety of technologies, such as Straight HTML; COM/ActiveX®; .NET® Client and integrations with other local applications such as Standalone .EXEs exposing APIs; Scriptable applications, such as JavaScript®, VB Script®, MS Excel®, etc. Accordingly, for some embodiments, the data centers 122-126 includes Internet Information Servers (IIS) 222-224 with ASP.NET components that performs transactions as web services. Data center databases 230 typically may include SQL Server 2000 Enterprise® architecture. In some embodiments, data access and data update is typically done via web services to access an SQL server (in a pod location) as a data source.

As previously mentioned, routing information or routing data is used to ensure requests from the user client or computer 300 in disparate locations are sent to a proper pod 242-246. Routing addresses the questions of (1) to which pod 242-246 does an application from a user's computer send requests and (2) how does it obtain this information. According to one embodiment, a routing routine is utilized that guarantees each user computer connects to the pod 242-246 assigned to its respective geographic region. Routing also addresses the question of how to handle a failover scenario. The routing routine typically ensures failover capability to a secondary pod 242 in the event their primary pod 244 fails and to provide a mechanism for modifying each user's routing configuration to avoid updating each client using SMS. The data center 122-126 typically includes four pods of servers to handle requests from a user's computer. Each pod 242-246 is assigned a region.

LOB applications 340 typically do not connect directly to a SQL server database in a server pod location 242-246. Data access typically occurs through web services on the Internet Information servers (IIS) 222-224. For some embodiments, a routing web service is typically used to retrieve information about the location of web services that is assigned to be used by the user from the SQL server database and then use this information to update user settings. A routing web method accesses the database and returns the routing information for a particular geographic location code (GLC).

Active directory 140 and metadirectory 150 provide important information to the routing framework in the disclosed embodiments. Accordingly, active directory 140 contains group information to distinguish user types, such as whether a user is a member of a "consumer" department or a "small business" department, for example. Also, metadirectory 150 contains GLC information to indicate where the user is geographically located. This information is maintained within the metadirectory 150. LOB application client 340 dynamically routes the user to their designated hardware based on GLC code that is obtained from the metadirectory 150.

Accordingly, for some embodiments, a user logs into his or her general-purpose computer 300 and authenticates himself or herself against the active directory 140. After authentication, group information from the active directory 140 is used to determine the profile of the current user, such as a member of a consumer department or a small business department, for example. Also, using a unique identifier (CUID) associated with the user, a lookup is performed against a metadirectory 150 to retrieve the user's geographic location code (GLC). As previously mentioned, the GLC is a unique code assigned to a user center 132-138. The user's computer then performs a search against an XML configuration file stored in the user client 300 using the GLC to retrieve the user's primary and secondary pods at a minimum. This information is then cached for faster retrieval and used throughout the lifetime of the current LOB application process (i.e., until the user closes the LOB application 340). Therefore, a copy of the user's routing data is maintained on his/her desktop of the general-purpose computer 300. Accordingly, the LOB application 340 uses the stored routing information to determine the appropriate pod 242-246 to utilize in accessing network resources for a particular user. To check if the resource information should be updated, upon start-up of the LOB application 340, a routing configuration file is retrieved from a database 230 using a web service and the stored routing information is compared to the routing configuration file and updated if necessary. Therefore, a copy of the user's routing data is maintained on the primary pod (in a SQL server database). Further, a copy of the user's routing data is maintained in the secondary pod through replication from the primary pod.

Figure 4:
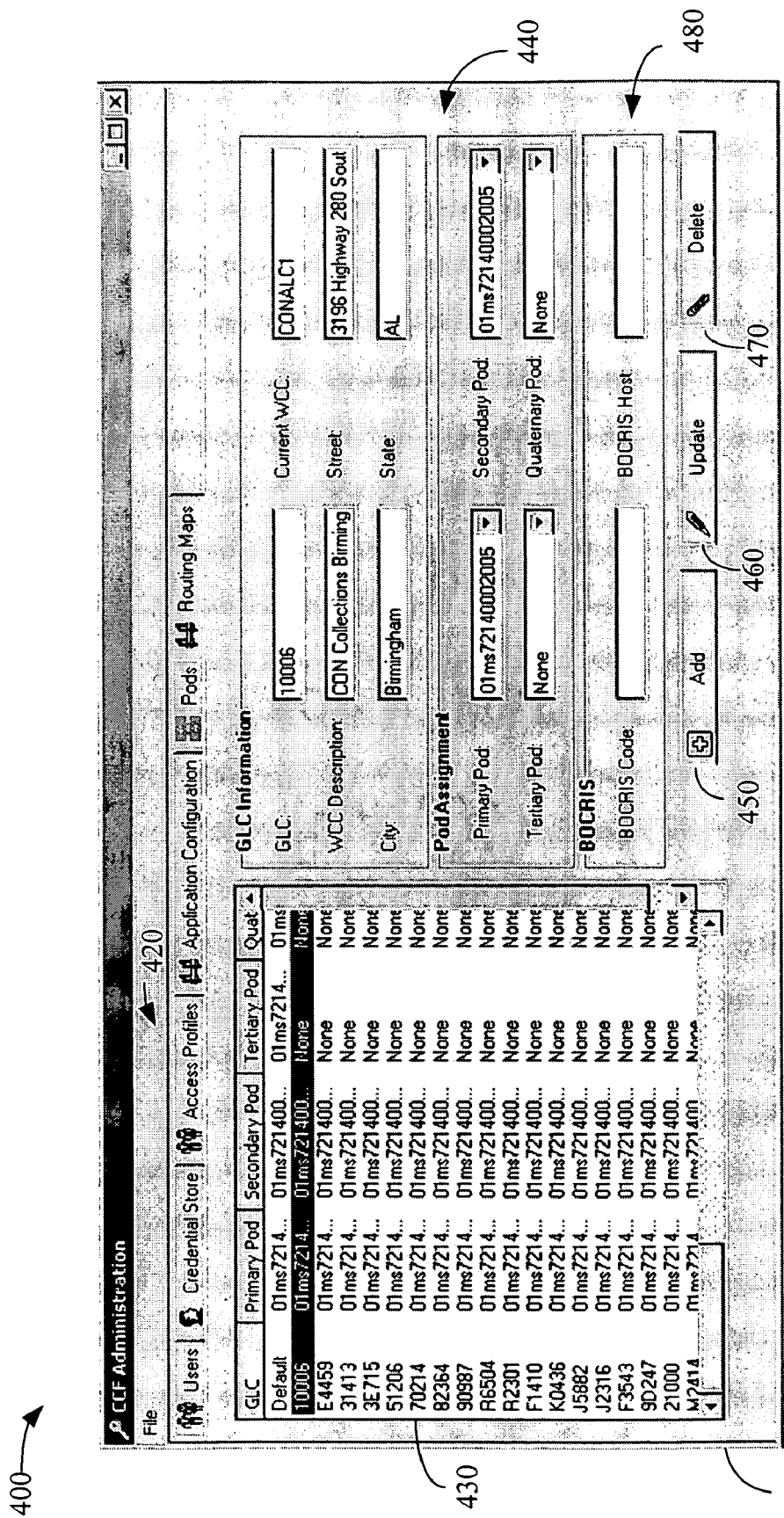
FIG. 4 is a screenshot display of one embodiment, among others, of an administrative manager interface as utilized in the system of FIG. 1.

To manage and configure routing data for a multitude of individual users (and other administrative tasks), an administrative manager 160 is used. FIG. 4 shows one embodiment 400 of an interface for the administrative manager 160. As shown in FIG. 4, a single graphical user interface window 410 is shown with a variety of graphical tab controls 420. On each tab, a label directed toward an administrative function is presented. For the embodiment of FIG. 4, the tabs are labeled "Users," "Credential Store," "Access Profiles," "Application Configuration," "Pods," and "Routing Maps." When a user selects one of these tabs (by clicking a mouse on the tab, for example), a set of information is displayed that is associated with the administrative function represented by the selected tab 420. Each of these administrative functions is described below.

First, as shown in FIG. 4, the Routing Maps tab has been selected and displays a box or table 430 of routing data. In particular, an administrator (or other authorized person, such as a supervisor, for example) can specify a primary pod and a second pod to be utilized by users having a certain GLC. For the embodiment 400 shown, an administrator can also specify a third or tertiary pod and a fourth or quaternary pod for a particular GLC.

In particular, the administrative manager provides input boxes 440 for providing information related to a GLC; providing pod assignments for the GLC; and for providing parameters for accessing legacy applications, such as a Business Office Customer Record Inquiry System (BOCRIS) application on the designated pod. To add a new GLC listing in the box to the left, an administrator can provide new information in one or all of the above boxes 440 on the right and select the Add button 450 at the bottom. To update a preexisting GLC listing, the administrator can add new information or edit preexisting information and then select the Update button 460 at the bottom. Also, to delete a preexisting GLC listing, the administrator can highlight an entry in the box 430 to the left and then click the Delete button 470 at the bottom. Using the above interface controls, the routing maps interface allows administrators, for example, to specify how web service calls are routed in case of a failover, based on the user's GLC. The default host of a LOB application for a GLC is also set on this screen, for some embodiments. In this particular embodiment 400, input boxes 480 are provided to specify a default BOCRIS host for a GLC.

Figure 5:
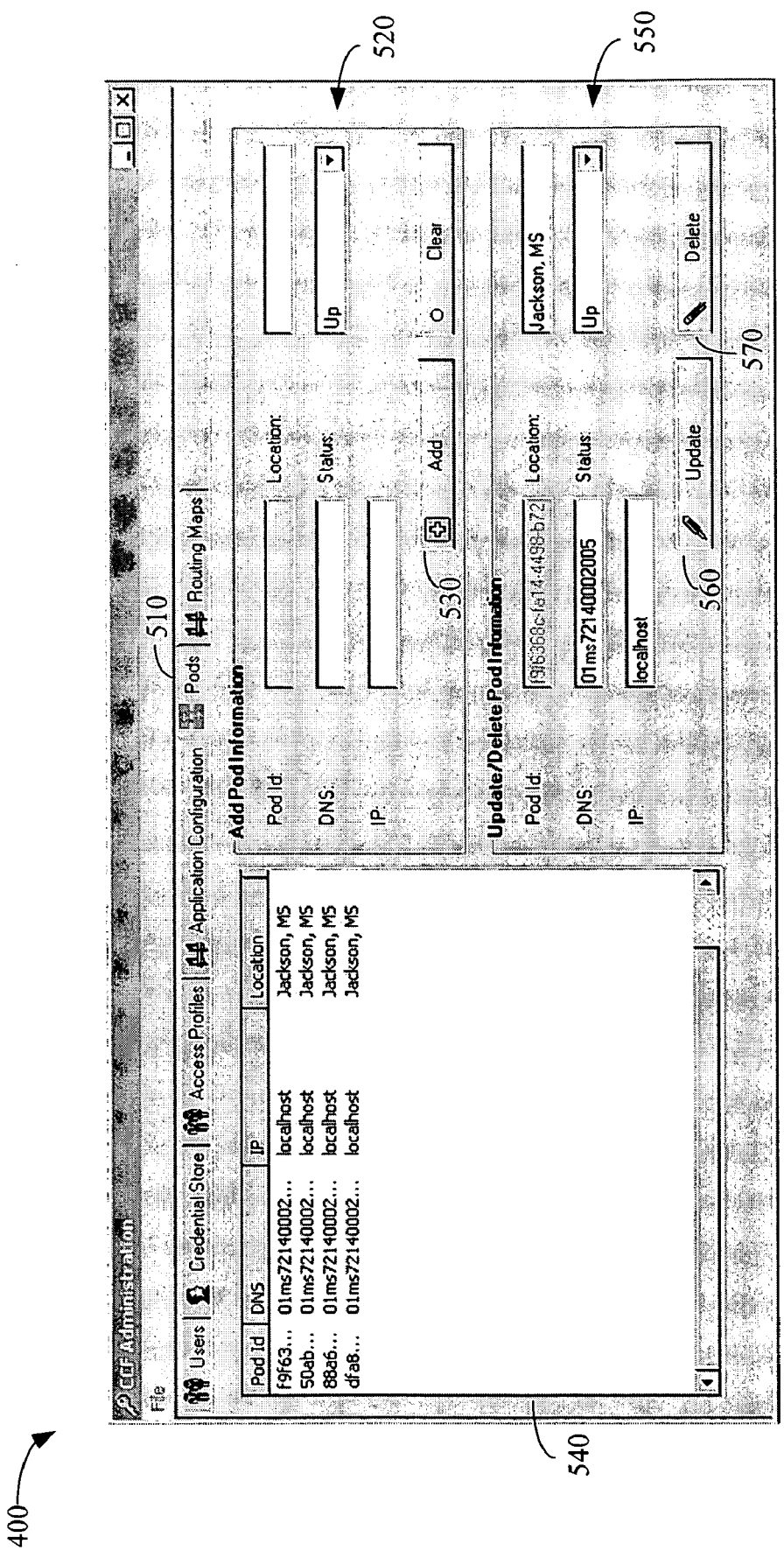
FIG. 5 is a screenshot display of one embodiment, among others, of the administration manager interface of FIG. 4 when a Pods tab has been selected.

Referring now to FIG. 5, the graphical interface of the administrative manager shows the interface controls that are displayed when a user has selected the Pods tab 510. The interface controls associated with the Pods tab 510 allow an administrator to add, update, and delete pod settings, where a pod specifies the location of web services utilized by a LOB application 340. As shown, to add pod information, an administrator can provide new information (such as Pod identifier, location, DNS, IP, and Status information) in the displayed boxes 520 and select the Add button 530. Alternatively, to update information, the administrator can select an entry from the list of pods being shown in the box 540 to the left and then change information displayed in the boxes 540 at the bottom-right for a selected pod. To save the changed information, the administrator can select the Update button 560. Diversely, to delete pod information, an administrator can select a pod entry from the box 540 on the left and then select the Delete button 570. Accordingly, from a single graphical interface, an administrator is able to modify settings for server pods and for routing information, as previously described.

Figure 6:
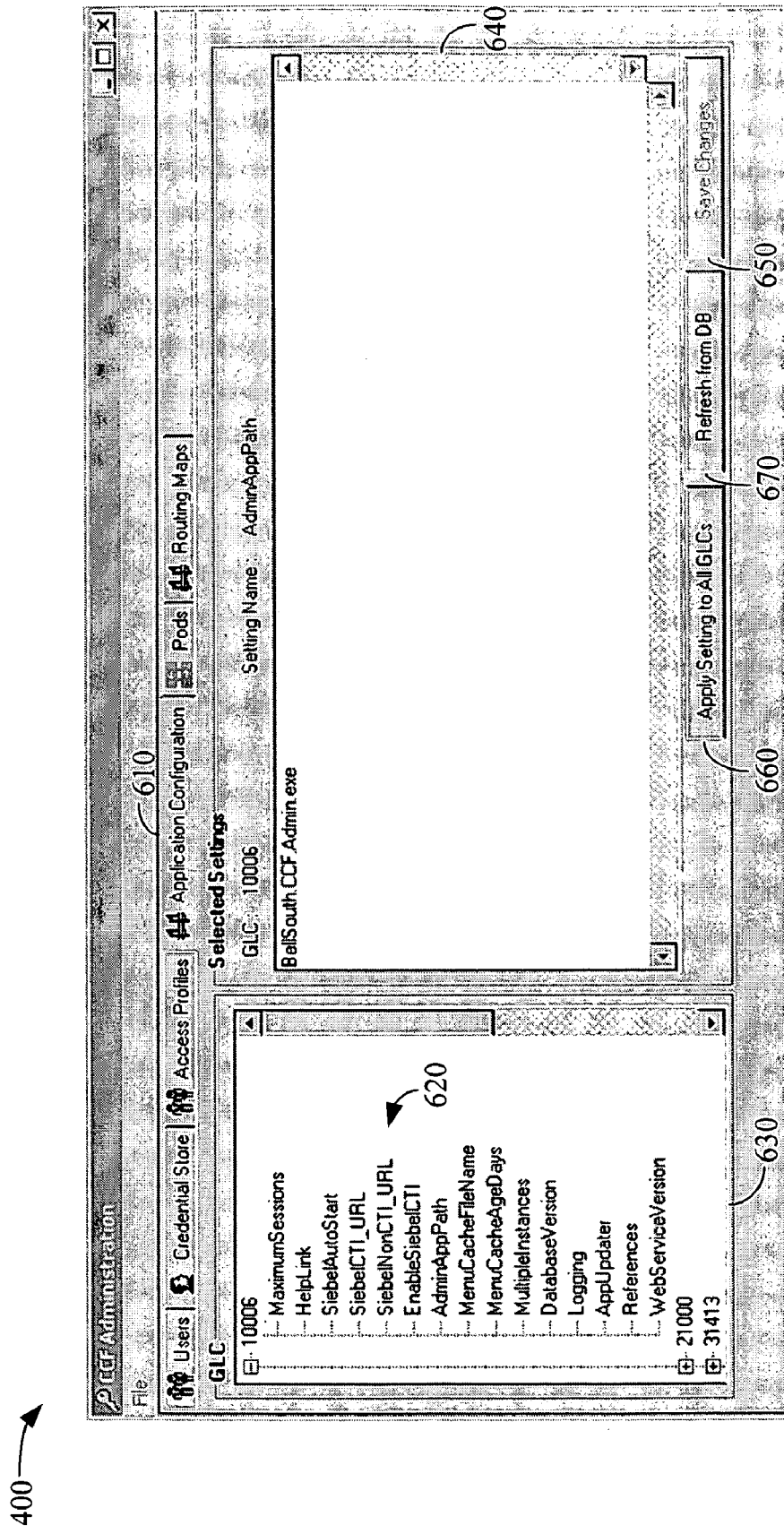
FIG. 6 is a screenshot display of one embodiment, among others, of the administration manager interface of FIG. 4 when a Configuration tab has been selected.

Correspondingly, FIG. 6 shows the interface controls that are associated with the Application Configuration tab 610 of the administration manager 400, for one embodiment. As shown, the application configuration interface controls allow modification of various application settings by GLC. In the example shown in FIG. 6, for GLC code 10006, a list 620 of application settings are shown in a graphical box 630 to the left. A particular setting can be selected or highlighted by a user. The current configuration of the selected field is then shown in the box 640 to the right. For example, the selected AdminAppPath setting is configured to the BellSouth.C-CF.Admin.exe file, as shown.

The displayed configurations can be edited within the display box 640 to the right and saved for the particular GLC code by selecting the Save button 650 or can be applied to all GLCs by selecting the Apply Setting to All GLCs button 660. Further, after making any changes, the application settings for all the GLCs can be refreshed to display the most current changes by selecting the Refresh from DB button 670.

As another feature of the network administration system 100 for some embodiments, users are assigned different user profiles. The different profiles, for example, provide for different privileges and restrictions to be associated with users. Accordingly, users of different business departments can have different customized desktop presentations according to the needs or preferences of the business departments. In addition, profiles can be used to help determine the applications that appear on a desktop of a user client 300.

Exemplary embodiments of the network administration system 100 include a routine that loads user settings from a network 230 database into a LOB application 340 and overwrites the default settings of the LOB application 340 prior to the rendering of the LOB application 340. Embodiments may also include a routine that saves the last application state to a network database 230 when the LOB application 340 exits.

Figure 7:
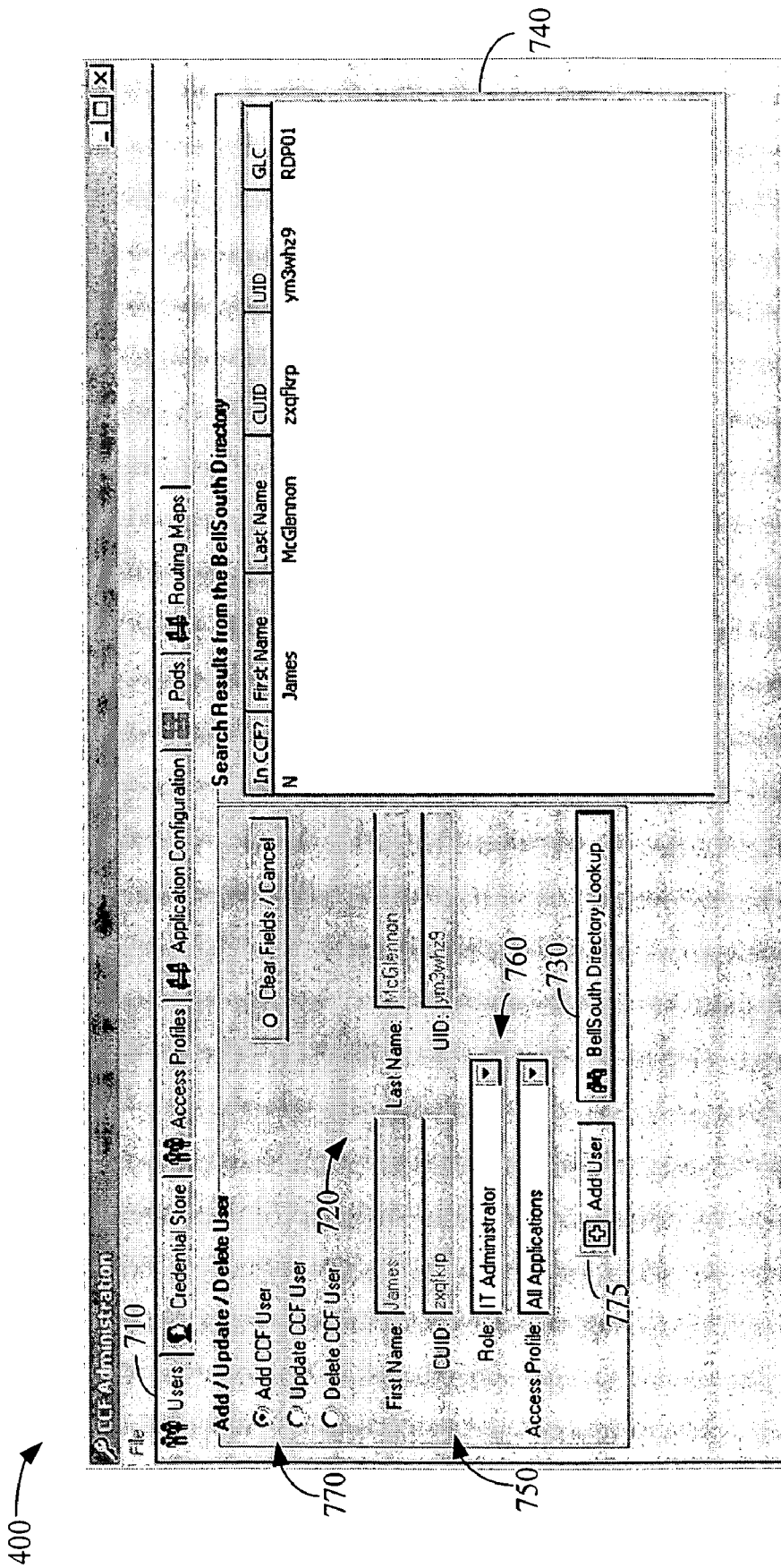
FIG. 7 is a screenshot display of one embodiment, among others, of the administration manager interface of FIG. 4 when a Users tab has been selected.
Figure 8:
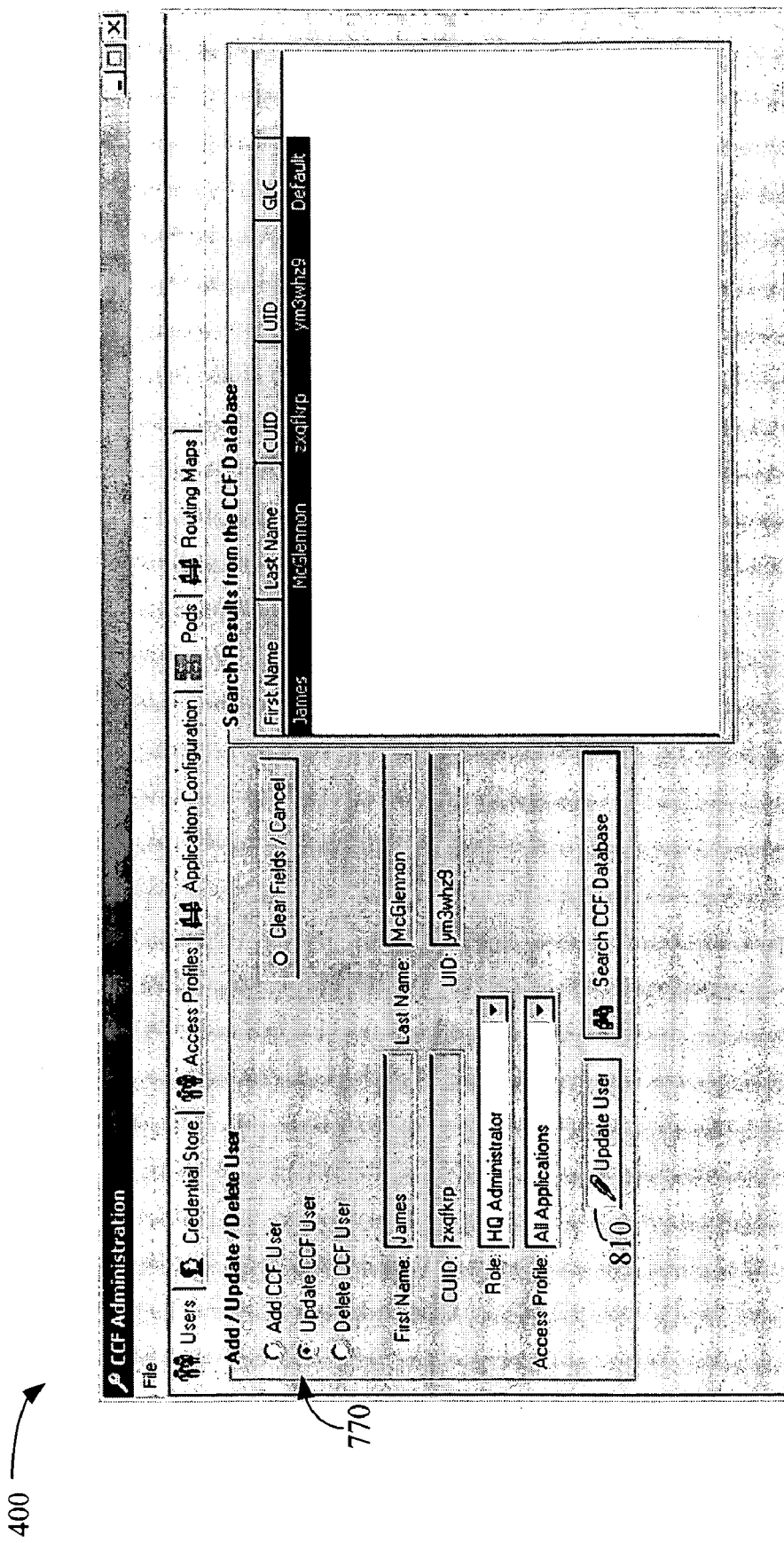
FIG. 8 is a screenshot display of one embodiment, among others, of the administration manager interface of FIG. 7 for updating user information.
Figure 9:
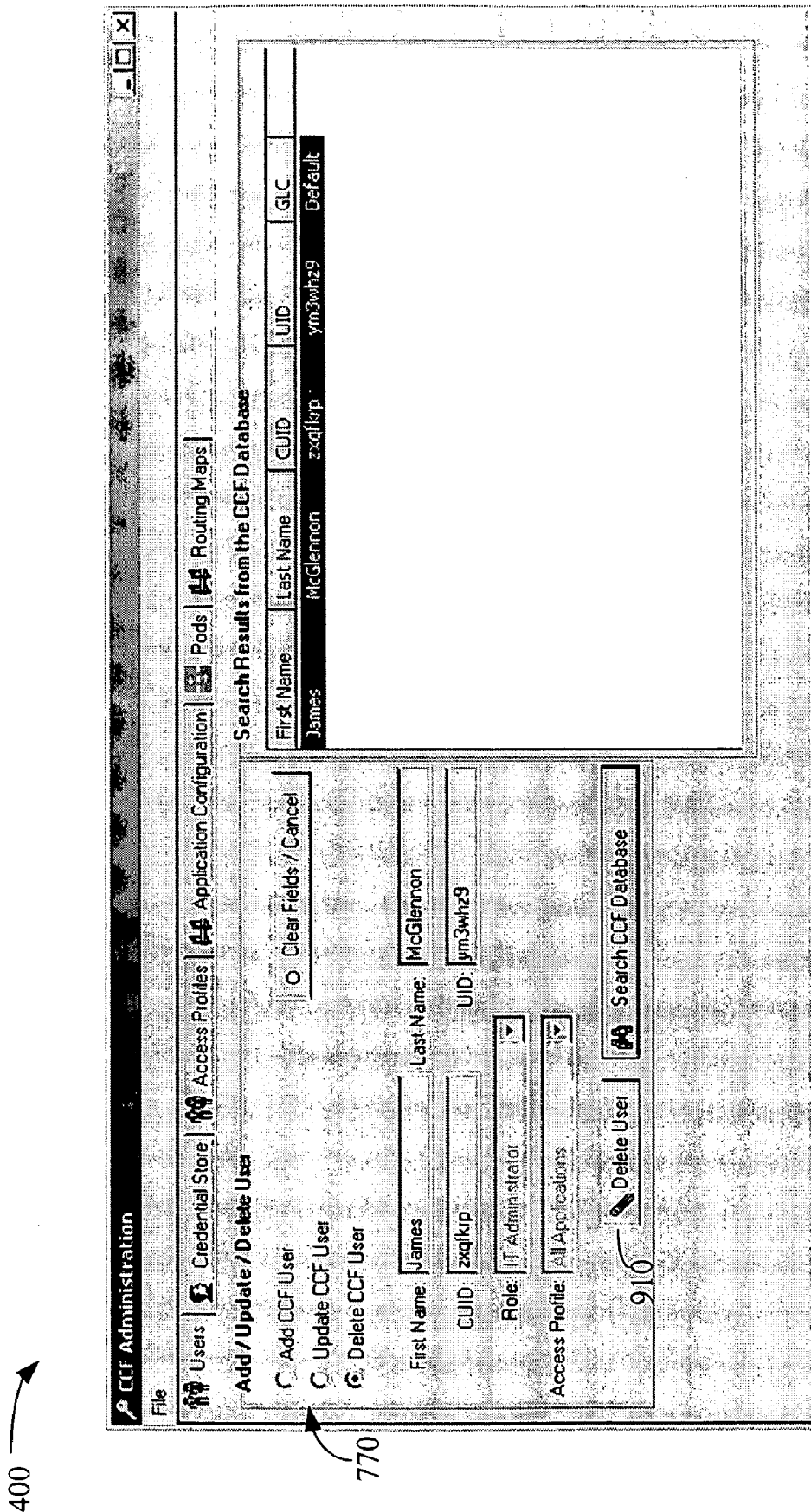
FIG. 9 is a screenshot display of one embodiment, among others, of the administration manager interface of FIG. 7 for deleting user information.

Referring now to FIGS. 7-11, the graphical interface of the administrative manager 400 shows the interface controls that are associated with configuring user settings. In FIG. 7, the interface controls for the administration interface are displayed for the situation where the Users tab 710 has been selected. Here, a name or partial name of a user (e.g., an associate assigned to a supervisor) may be provided in the First Name and/or Last Name boxes 720 and upon selection of the BellSouth® Directory Lookup button 730, user information is retrieved via a search in the network directories 140, 150. If multiple records are retrieved in the listbox 740 to the right (from the search), the desired record can be selected and populated in the left part 750 of the interface screen. In addition, a user role (e.g., IT Administrator, HQ Administrator, etc.) for the selected user can be designated along with an access profile for the user, as shown in input boxes 760. The access profile specifies a type of access that the listed user has to applications that are associated with his or her user role. For example, in the example shown in FIG. 7, the user has been assigned an access profile for "All Applications." A selected record or entry can then be added to the appropriate network directories of users of the network administration system 100 by selecting the Add CCF User radio button 770 and the Add User button 775 at the bottom. Alternatively, a selected entry can be updated by editing user information in the boxes 750 to the left and selecting the Update CCF User radio button 770 and selecting the Update User Button 810 (that is dynamically displayed when the Update CCF User radio button is selected), as shown in FIG. 8. Accordingly, in update mode, modification of the user's role or access profile is allowed. Changes to user information are synched up nightly in the data center databases 230 from the network directories 140, 150. Correspondingly, selection of the Delete CCF User radio button 740 and the Delete User button 910 (whose display is dynamically shown upon selection of the Delete CCF User radio button) deletes the selected entry, as shown in FIG. 9.

Figure 10:
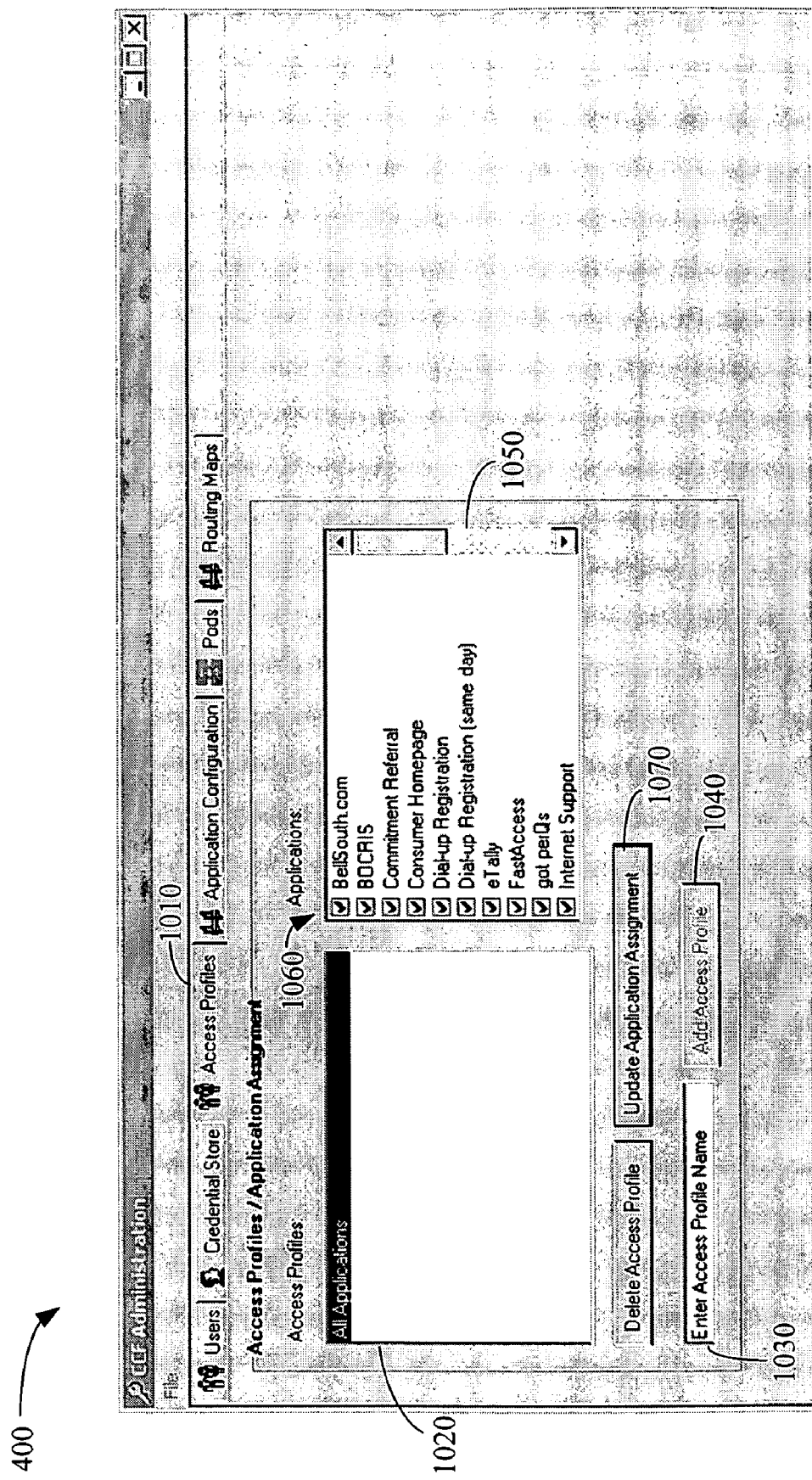
FIG. 10 is a screenshot display of one embodiment, among others, of the administration manager interface of FIG. 4 when an Access Profiles tab has been selected.

For access profiles, an administrator can create and modify access profiles using the administration manager 400, for some embodiments by selecting the Access Profiles tab 1010, as shown in FIG. 10. Accordingly, FIG. 10 shows one embodiment of the interface controls associated with a selection of the Access Profiles tab. Here, the different access profiles are shown in a list box 1020 on the left. To add a new access profile to the list 1020, an administrator can specify a name for the profile in the input box 1030 at the bottom and select the Add Access Profile button 1040. To modify a pre-existing access profile, the administrator can select an access profile entry from the list box 1020. If only one access profile entry is shown in the list box 1020, then the lone entry is automatically assumed to be selected. On the right, a list box 1050 shows all of the possible applications that can be associated with an access profile along with adjacent checkboxes 1060. Accordingly, for a selected access profile entry, the applications associated with the selected access profile have checkboxes with checks and the applications that are not associated with the selected access profile have empty checkboxes. To modify which applications are associated with the selected access profile, the administrator can click on the checkboxes 1060 and select the Update Application Assignment button 1070.

Figure 11:
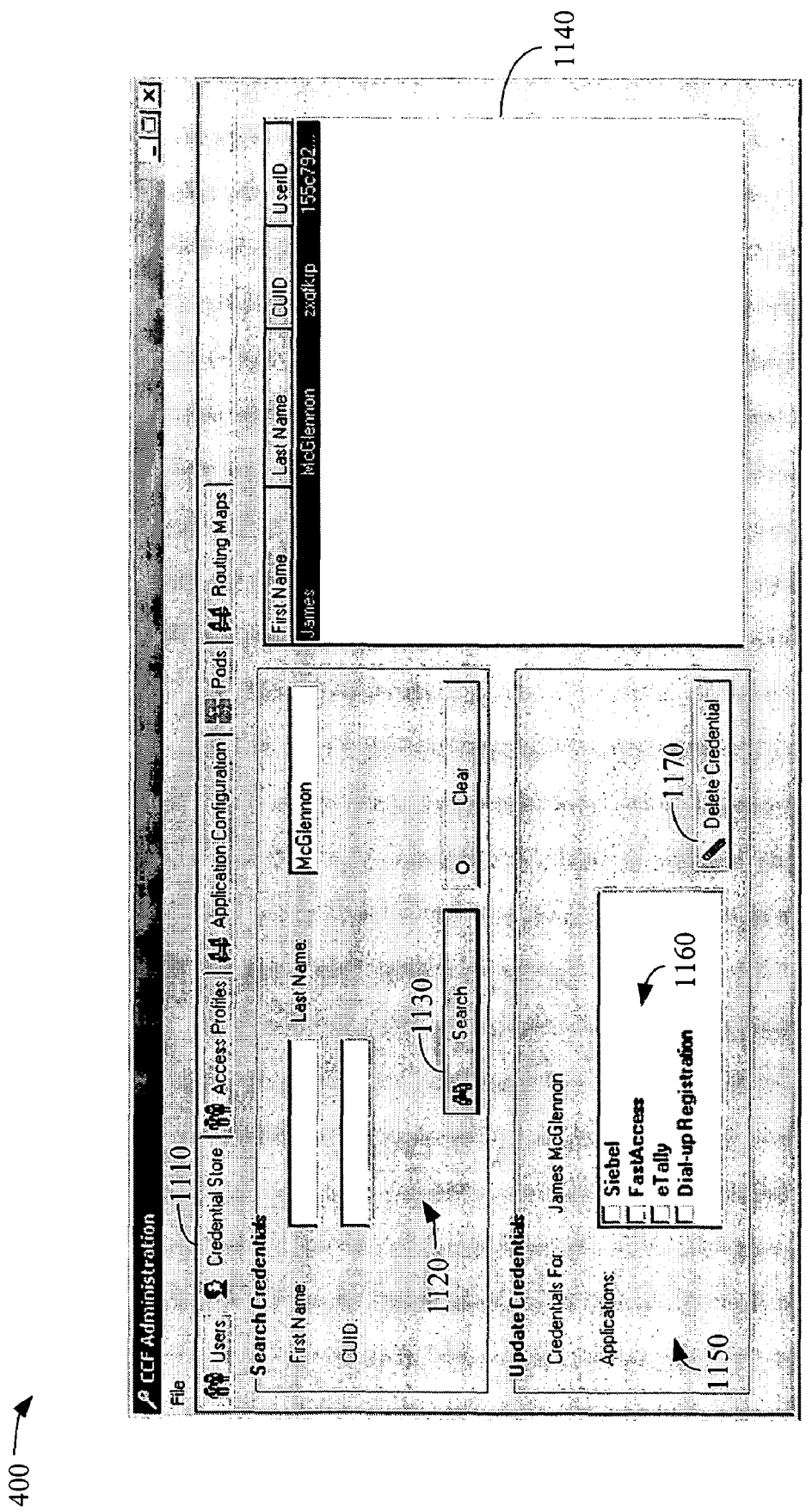
FIG. 11 is a screenshot display of one embodiment, among others, of the administration manager interface of FIG. 4 when a Credentials Store tab has been selected.

Further customization of user settings can be performed, in some embodiments, by selection of the Credential Store tab 1110 of the administration manager, as shown in FIG. 11. An administrator therefore can locate a particular user by providing name information or CUID of the user in input boxes 1120 and selecting the Search button 1130 which results in a search for the user in the network directories 140, 150. From the listbox 1140 on the right, the administrator or supervisor can select the desired user entry, if more than one entry was returned from the search. Otherwise, a lone entry is assumed to be the selected entry. Information associated with the selected entry is shown on the pane 1150 to the bottom-left. Particularly, the applications 1160 that the selected user is authorized to access are displayed with adjacent checkboxes. By selecting a checkbox next to a particular application and selecting the Delete button 1170, the administrator can remove credentials (e.g., username, password, etc.) associated with a particular application from the list of applications 1160 that the user is authorized to access. Therefore, next time the user attempts to access the particular application, the user will have to re-enter his or her credentials for that particular application.

Figure 12:
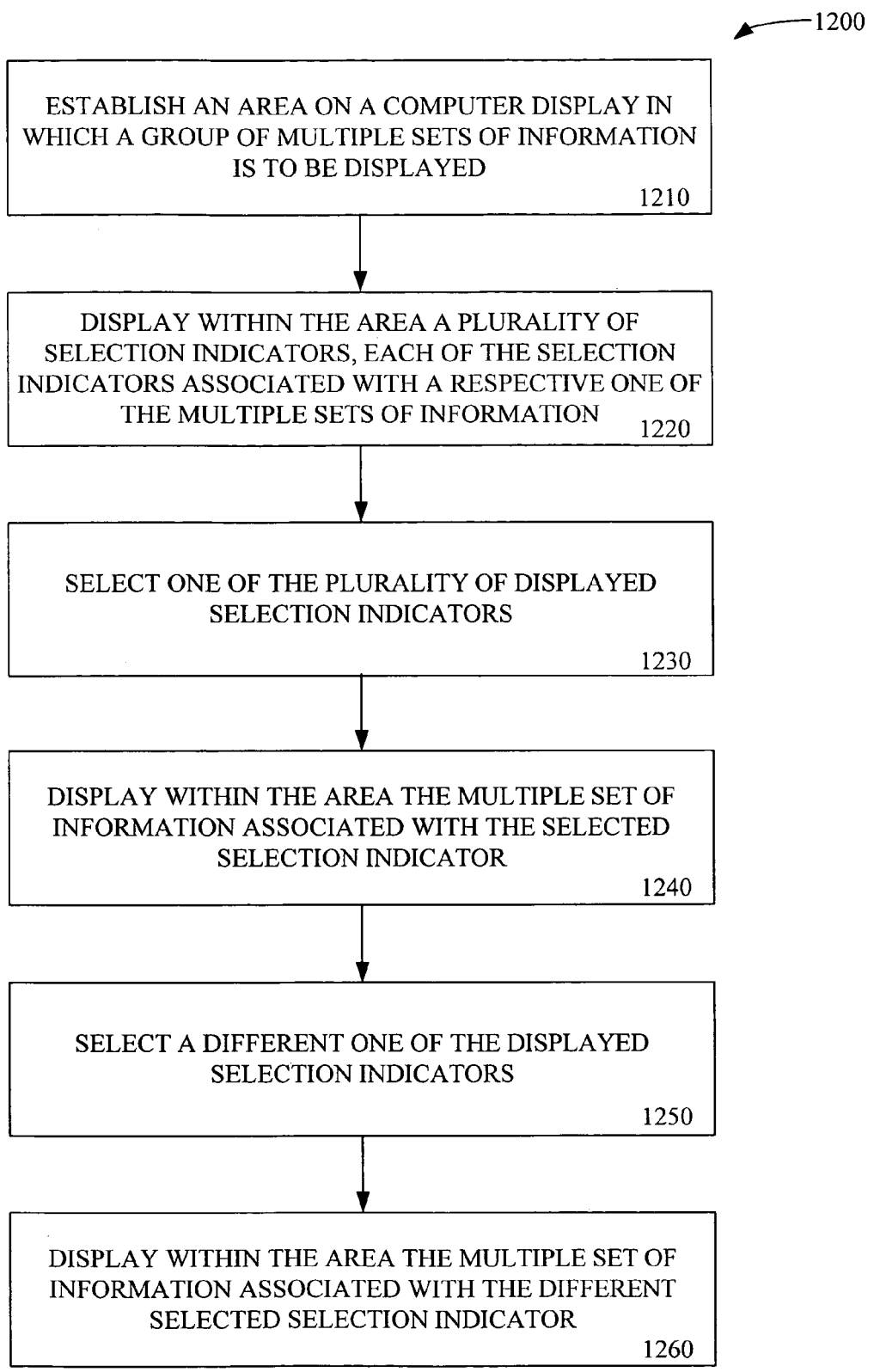
FIG. 12 is a flowchart describing functionality of one embodiment, among others, of the network administration system of FIG. 1.

Therefore, as shown by FIGS. 4-11, embodiments of the network administration system 100 provide a composite administrative interface that groups together distinct administrative tools on one user interface. The flowchart of FIG. 12 shows the functionality of one implementation of the network administration system 100 of the present disclosure. As depicted in FIG. 12, the functionality of a representative embodiment of the network administration system 100 or method 1200 may be construed as beginning at the step of establishing (1210) an area on a computer display in which a group of multiple sets of information is to be displayed. In some embodiments, this area should have a size which is less than the entire area of the computer display. Further, in some embodiments, the multiple sets of information include tools for configuring and modifying network settings (e.g., user-settings, hardware settings, software settings, access-rights, network routing specifications, etc.) related to a call-center environment. Then, within the area, a plurality of selection indicators is displayed (1220). Each of the selection indicators is associated with a respective one of the multiple sets of information. By selecting (1230) one of the plurality of displayed selection indicators, the multiple set of information that is associated with the selected selection indicator is displayed (1240) within the area on the computer display. Further, by selecting (1250) a different one of the displayed selection indicators, the multiple set of information associated with the different selected selection indicator is displayed (1260) within the area on the computer display. For some embodiments, the multiple sets of information include tools for specifying physical location of network hardware; tools for specifying hardware location storing a computer application; tools for specifying network resources that a particular user is authorized to access, etc.

It should be emphasized that the above-described embodiments of the present disclosure, particularly, any "preferred" or "exemplary" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure.

Therefore, having thus described the invention, at least the following is claimed:

1. A system for managing an enterprise network, comprising:
    an administration manager interface to a plurality of administration tools for managing user access to computer applications on the enterprise network;
    a first graphical tool for assigning a user profile to a particular user, wherein the first graphical tool is accessible from the administration manager interface and the user profile is used to determine presentation of applications that appear on a desktop of the particular user;
    a second graphical tool for designating network resources to a particular user; wherein the second graphical tool is accessible from the administration manager interface and the network resources comprise at least one pod to be used to access the enterprise network by the particular user, wherein a pod comprises a server grouping servicing requests from a client of the particular user;
    a third graphical tool for customizing application access rights for a particular user, wherein the third graphical tool is accessible from the administration manager interface and the application access rights include rights to access applications available on the enterprise network;
    a fourth graphical tool for identifying the location of network resources, wherein the fourth graphical tool is accessible from the administration manager interface and the location of network resources comprises an address for the at least one pod to be used to access the enterprise network by the particular user; and
    a computer processor configured to execute at least the administration manager interface.

2. The system of claim 1, further comprising:
    a plurality of user clients to access the enterprise network; and
    a plurality of computer applications to be accessed by the plurality of user clients.

3. The system of claim 2, wherein the administration manager interface is enabled to provide a screen for assigning a user to a particular data center.

4. The system of claim 1, wherein the administration manager interface is configured to manage administration functions of a call-center environment.

5. A method for managing an enterprise network, comprising:
    displaying a single graphical window on a computer display as an interface to a network administration program, the network administration program configured to determine which applications are available to and appear on computer desktops of other network users whose network access on the enterprise network is administered using the network administration program; and
    providing a plurality of graphical controls within the single graphical window, each graphical control accessing a different administration operation for an enterprise network, wherein each graphical control is selectable by an administrator from the single graphical window,
        the providing of the plurality of controls further comprising:
            providing graphical controls dedicated to initiating tools for performing: designating network resources to a particular user, wherein the network resources comprise at least one pod to be used to access the enterprise network by the particular user; customizing application access rights for a particular user, wherein the application access rights include rights to access applications available on the enterprise network; identifying the location of network resources in the enterprise network, wherein the location of network resources comprises an address for the at least one pod to be used to access the enterprise network by the particular user; and configuring user profiles, wherein the user profile is used to determine presentation of applications that appear on a desktop of the particular user and a pod comprises a server grouping servicing requests from a client of the particular user.

6. The method of claim 5, the providing of the plurality of graphical controls further comprising:
    providing a first graphical control dedicated to specifying physical locations of network hardware;
    providing a second graphical control dedicated to identifying network hardware storing a particular software application; and
    providing a third graphical control dedicated to specifying software applications that a particular user can access.

7. The method of claim 5, wherein:
    the displaying of the single graphical window comprises:
        establishing an area on the computer display in which a group of multiple sets of information is to be displayed, the area having a size which is less than the entire area of the computer display; and
    the providing of the plurality of graphical controls comprising:
        displaying within the area a plurality of selection indicators, each being associated with one of the multiple sets of information;
        selecting one of the plurality of selection indicators;
        displaying within the area one of the multiple sets of information from the group of multiple sets of information upon selection of the one of the plurality of selection indications, the one of the multiple sets of information being associated with the one of the plurality of selection indicators; and
        displaying within the area another one of the multiple sets of information from the group of multiple sets of information upon selection of the another one of the plurality of selection indicators, the another one of the multiple sets of information being associated with another one of the plurality of the selection indicators, wherein:
    the multiple sets of information comprise a plurality of tools for configuring a network for implementing a call-center environment, the plurality of tools comprising:
        a first tool for specifying a physical location of network hardware;
        a second tool for specifying hardware location storing a computer application; and
        a third tool for specifying network resources that a particular user is authorized to access.

8. A computer-readable storage medium having a program fro managing an enterprise network, the program performing:
    displaying a single graphical window on a computer display as an interface to a network administration program, the network administration program configured to determine which applications are available to and appear on computer desktops of other network users whose network access on the enterprise network is administered using the network administration program; and
    providing a plurality of graphical controls within the single graphical window, each graphical control accessing a different administration operation for an enterprise network, wherein each graphical control is selectable by an administrator from the single graphical window,
        the providing of the plurality of graphical controls further comprising:
            providing graphical controls dedicated to initiating tools for performing:
            designating network resources to a particular user, wherein the network resources comprise at least one pod to be used to access the enterprise network by the particular user; customizing application access rights for a particular user, wherein the application access rights include rights to access applications available on the enterprise network; identifying the location of network resources in the enterprise network, wherein the location of network resources comprises an address for the at least one pod to be used to access the enterprise network by the particular user; and configuring user profiles, wherein the user profile is used to determine presentation of applications that appear on a desktop of the particular user and a pod comprises a server grouping serving requests from a client of the particular user.

9. The medium of claim 8, the providing of the plurality of graphical controls further comprising:
    providing a first graphical control dedicated to specifying physical locations of network hardware;
    providing a second graphical control dedicated to identifying network hardware storing a particular software application; and
    providing a third graphical control dedicated to specifying software applications that a particular user can access.

10. The medium of claim 8, wherein:
    the displaying of the single graphical window comprises:
        establishing an area on the computer display in which a group of multiple sets of information is to be displayed, the area having a size which is less than the entire area of the computer display; and
    the providing of the plurality of graphical controls comprising:

displaying within the area a plurality of selection indicators, each being associated with one of the multiple sets of information;

selecting one of the plurality of selection indicators;

displaying within the area one of the multiple sets of information from the group of multiple sets of information upon selection of the one of the plurality of selection indications, the one of the multiple sets of information being associated with the one of the plurality of selection indicators; and displaying within the area another one of the multiple sets of information from the group of multiple sets of information upon selection of the another one of the plurality of selection indicators, the another one of the multiple sets of information being associated with another one of the plurality of the selection indicators, wherein:

the multiple sets of information comprise a plurality of tools for configuring a network for implementing a call-center environment, the plurality of tools comprising:

a first tool for specifying a physical location of network hardware;

a second tool for specifying hardware location storing a computer application; and a third tool for specifying network resources that a particular user is authorized to access.

11. An apparatus for managing user access to computer applications on an enterprise network, comprising:

a single user interface enabling an administrator to access network administrative tools;

a first administrative tool for assigning a user profile to a particular user, the first administrative tool capable of being accessed from the single user interface and the user profile being used to determine presentation of applications that appear on a desktop of the particular user;

a second administrative tool for designating network resources to a particular user, the second administrative tool capable of being accessed from the single user interface and the network resources comprising at least one pod to be used to access the enterprise network by the particular user, wherein a pod comprises a server grouping servicing requests from a client of the particular user;

a third administrative tool for customizing application access rights for a particular user, the third administrative tool capable of being accessed from the single user interface and the application access rights including rights to access applications available on the enterprise network;

a fourth administrative tool for identifying the location of network resources, the fourth administrative tool capable of being accessed from the single user interface and the location of network resources comprising an address for the at least one pod to be used to access the enterprise network by the particular user; and a computer processor configured to execute at least the single user interface.

12. The apparatus of claim 11, wherein the apparatus is configured to manage administration functions of a call-center environment.

13. The apparatus of claim 11, wherein the apparatus is enabled to provide a screen for assigning a user to a particular data center.

14. The apparatus of claim 11, wherein the single user interface is a graphical user interface.

15. The apparatus of claim 11, wherein the fourth administrative tool is capable of identifying which software applications are located on particular hardware devices.

16. The apparatus of claim 11, wherein the access rights are assigned based on which organization the particular user is a member.

17. The apparatus of claim 11, further comprising:

logic configured to retrieve user settings from a network database and to overwrite default settings of a computer application with the retrieved user settings prior to the rendering of the computer application.

18. The apparatus of claim 17, further comprising:

logic configured to save the last state of the computer application to a network database when the computer application exits.

* * * * *